United States Patent
Tobita et al.

(10) Patent No.: US 6,333,114 B1
(45) Date of Patent: Dec. 25, 2001

(54) POLYCARBONATE RESIN COEXTRUDED ARTICLE

(75) Inventors: Etsuo Tobita; Shin-ichi Ishikawa; Takashi Ayabe; Saeko Kawaragi, all of Saitama-ken (JP)

(73) Assignee: Asahi Denka Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/515,901

(22) Filed: Feb. 29, 2000

(30) Foreign Application Priority Data

Mar. 2, 1999 (JP) .................................. 11-054718
Oct. 6, 1999 (JP) .................................. 11-286039

(51) Int. Cl.⁷ .................................................... B32B 27/36
(52) U.S. Cl. ...................... 428/412; 264/176.1; 528/196; 528/198
(58) Field of Search ............................. 428/412; 528/196, 528/198; 264/176.1

(56) References Cited

FOREIGN PATENT DOCUMENTS

| 0500496 A1 | 8/1992 | (EP) . |
|---|---|---|
| 0825226 A3 | 2/1998 | (EP) . |
| 2 290 745 | 1/1996 | (GB) . |
| 59-101360 | 6/1984 | (JP) . |
| 1-165419 | 6/1989 | (JP) . |
| 11181304 | 7/1996 | (JP) . |

*Primary Examiner*—Terressa M. Boykin
(74) *Attorney, Agent, or Firm*—Young & Thompson

(57) ABSTRACT

A polyycarbonate resin coextruded article having a thermoplastic aromatic polycarbonate resin core layer and a thermoplastic aromatic polycarbonate resin cover layer which is provided on at least one side of the core layer, wherein the cover layer contains 0.1 to 25 parts by weight of a triazine light stabilizer represented by formula (I) per 100 parts by weight of the thermoplastic aromatic polycarbonate.

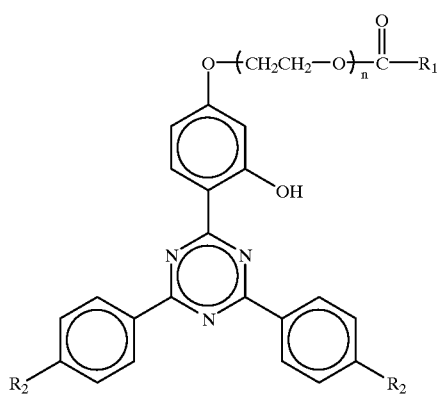

(I)

wherein $R_1$ represents an alkyl group having 1 to 17 carbon atoms; $R_2$ represents a hydrogen atom or an alkyl group having 1 to 4 carbon atoms; and n represents an integer of 1 to 20.

15 Claims, No Drawings

POLYCARBONATE RESIN COEXTRUDED ARTICLE

BACKGROUND OF THE INVENTION

The present invention relates to a thermoplastic aromatic polycarbonate molded article which has improved weatherability and improved resistance to coloring. More particularly, it relates to a coextruded polycarbonate resin article having improved weatherability and improved coloring resistance which comprises a thermoplastic aromatic polycarbonate resin core layer having on at least one side thereof a thermoplastic aromatic polycarbonate resin cover layer containing a triazine light stabilizer and is useful as various molded articles such as food packaging containers, interior and exterior automotive trim parts, and precision machines, films, constructional materials, and the like.

Polycarbonate resins are widely used as windowpanes, roofing materials for arcades, food packaging containers, automotive parts, precision machines, etc. for their strength, rigidity, wear resistance, chemical resistance, and transparency.

However, polycarbonate resins have limited applicability because they have insufficient weatherability and are prone to discoloration or strength reduction when used outdoors or under fluorescent lamps.

Hence, polycarbonate resins have been used in combination with one or more than one of various light stabilizers. In particular, benzotriazole light stabilizers are in general use because of their relatively high effects. Benzotriazole light stabilizers are effective to some extent but still insufficient for imparting resistance to coloring by high-temperature processing, leaving room for further improvement.

Further, polycarbonate resins easily receive damage to the surface by intense ultraviolet radiation, developing a great number of fine crazes on the essentially glossy surface, which results in haze.

Polycarbonate resin molded articles having a core layer on which a light stabilizer-containing cover layer is provided by coextrusion to protect the surface have been proposed as disclosed, e.g., in Japanese Patent Laid-Open No. 101360/84, but they are disadvantageous in that the resin is colored. Japanese Patent Laid-Open No. 165419/89 discloses a polycarbonate resin coextruded article having a cover layer containing a benzotriazole light stabilizer. This technique involves the problem that the resin is colored when processed at an extremely high temperature of 300° C. or higher with a large amount of the light stabilizer compounded therein. British Patent 2290745 describes a polycarbonate resin coextruded article having a cover layer containing a triazine light stabilizer. However, sufficient weatherability is not obtained due to poor compatibility of the light stabilizer with the resin component.

SUMMARY OF THE INVENTION

Accordingly, an object of the present invention is to provide a polycarbonate resin coextruded article having a core layer and a cover layer which exhibits improved weatherability and improved resistance to coloring by high-temperature processing.

As a result of extensive investigations, the present inventors have found that the above object is accomplished by a polycarbonate resin coextruded article having a core layer and a cover layer wherein the cover layer contains a triazine ultraviolet absorber having a specific structure. The present invention has been completed based on this finding.

The present invention provides a polycarbonate resin coextruded article having a core layer comprising a thermoplastic aromatic polycarbonate resin and a cover layer comprising a thermoplastic aromatic polycarbonate resin which is provided on at least one side of the core layer, wherein the cover layer comprises a resin composition comprising 100 parts by weight of a thermoplastic aromatic polycarbonate resin and 0.1 to 25 parts by weight of a triazine light stabilizer represented by formula (I):

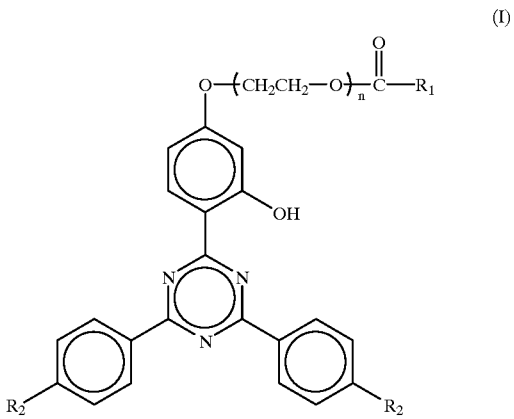

wherein $R_1$ represents an alkyl group having 1 to 17 carbon atoms; $R_2$ represents a hydrogen atom or an alkyl group having 1 to 4 carbon atoms; and n represents an integer of 1 to 20.

DETAILED DESCRIPTION OF THE PREFERRED EMBODIMENTS

The polycarbonate resin composition according to the invention will be described in detail with reference to the preferred embodiments thereof.

The thermoplastic aromatic polycarbonate resin which can be used in the present invention preferably includes polycarbonic esters of bisphenol compounds. The bisphenol compounds include bisphenols, such as bis(4-hydroxyphenyl)methane, 2,2-bis(4-hydroxyphenyl)propane (hereinafter referred to as bisphenol A), 2,2-bis(4-hydroxy-3-methylphenyl)propane, 4,4-bis(hydroxyphenyl)heptane, 2,2-bis(4-hydroxy-3,5-dichlorophenyl)propane, and 2,2-bis(4-hydroxy-3,5-dibromophenylpropane; diphenyl ethers, such as bis(4-hydroxyphenyl) ether and bis(3,5-dichloro-4-hydroxyphenyl) ether; dihydroxydiphenyls, such as p,p'-dihydroxydiphenyl and 3,3'-dichloro-4,4'-dihydroxydiphenyl; dihydroxyaryl sulfones, such as bis(4-hydroxyphenyl) sulfone, bis(3,5-dimethyl-4-hydroxyphenyl) sulfone; dihydroxybenzenes, such as 1,4-dihydroxy-2,5-dichlorobenzene and 1,4-dihydroxy-3-methylbenzene; resorcinol, hydroquinone, halogen-and alkyl-substituted dihydroxybenzenes; and dihydroxyphenyl sulfoxides, such as bis(4-hydroxyphenyl) sulfoxide and bis (3,5-dibromo-4-hydroxyphenyl) sulfoxide. Other various bisphenol compounds and triphenol compounds are also useful. The bisphenol compounds can be used either individually or as a mixture thereof The thermoplastic aromatic polycarbonate resins can be prepared by, for example, the reaction between a dihydric phenol and a carbonate precursor. The carbonate precursor includes carbonyl halides, carbonic esters and haloformates. Examples of the carbonyl halides are carbonyl bromide, carbonyl chloride and a mixture thereof. Examples of the carbonic esters are diphenyl carbonate, di(chlorophenyl) carbonate, ditolyl carbonate, dinaphthyl carbonate, and mixtures thereof. Examples of the haloformates are dihydric phenol haloformates, such as hydroquinone bischloroformate, and glycol haloformates, such as ethylene glycol haloformate. Preferred of them is carbonyl chloride, which is known as phosgene.

The thermoplastic aromatic polycarbonate resins are prepared by using a molecular weight regulator and an acid acceptor. Suitable molecular weight regulators include phenol cyclohexanol, methanol p-t-butylphenol, and p-bromophenol, with p-t-butylphenol being preferred. The acid acceptors may be organic or inorganic. Examples of the organic acid acceptors include pyridine, triethylamine, and dimethylaniline. Examples of the inorganic acid acceptors include hydroxides, carbonates, hydrogencarbonates or phosphates of alkali metals or alkaline earth metals.

In the light stabilizers represented by formula (I) or (II), the alkyl group as represented by $R_1$ includes methyl, ethyl, propyl, isopropyl, butyl, isobutyl, sec-butyl, t-butyl, pentyl, sec-pentyl, t-pentyl, hexyl, isohexyl, heptyl, 1-ethylpentyl octyl isooctyl 1,1,3,3-tetramethylbutyl, nonyl, decyl, isodecyl, undecyl, dodecyl, tridecyl, tetradecyl, pentadecyl hexadecyl, and heptadecyl.

The alkyl group as represented by $R_2$ in formulae (I) and (II) includes methyl, ethyl, propyl, isopropyl, butyl, isobutyl, sec-butyl, and t-butyl, In formula (I), n represents an integer of 1 to 20, preferably an integer of 1 to 10.

Specific examples of the triazine light stabilizers represented by formula (I) include the following compounds.

Compound No. 1

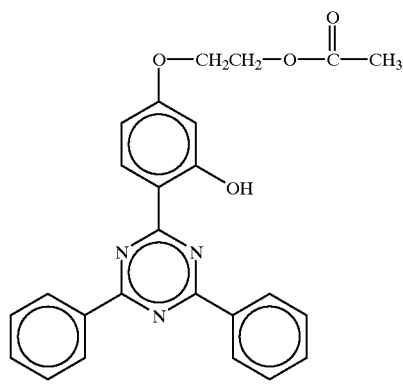

Compound No. 2

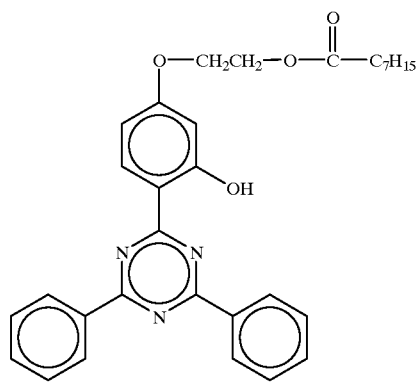

Compound No. 3

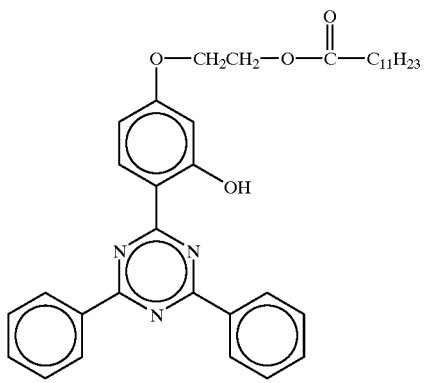

Compound No. 4

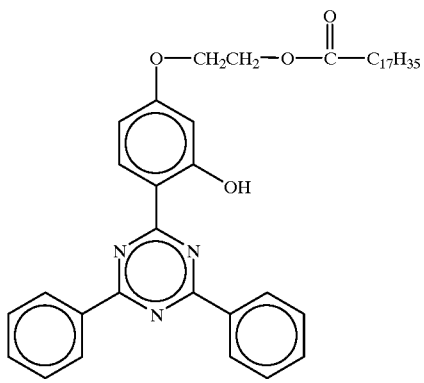

Compound No. 5

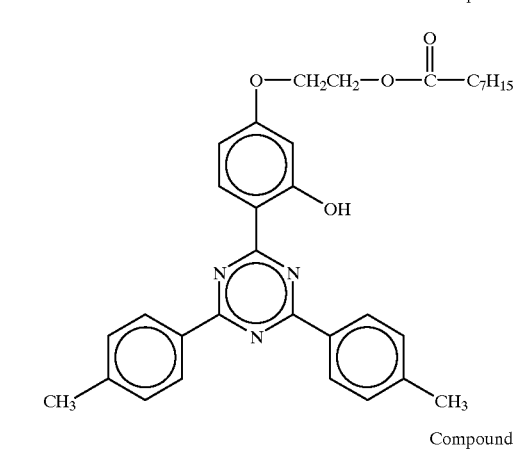

Compound No. 6

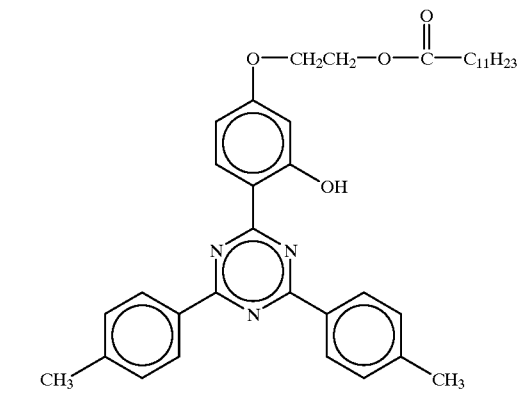

-continued

Compound No. 7

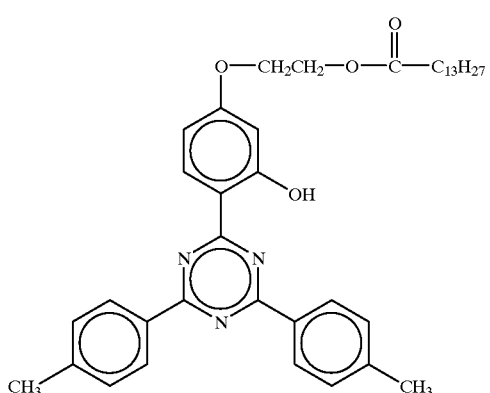

Compound No. 8

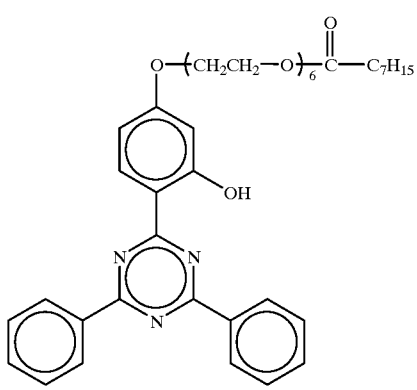

The triazine light stabilizer of formula (I) can be synthesized by any known method generally employed for triaryltriazine compounds with no particular restriction. For example, compound No. 1 is prepared by esterifying 2-(2-hydroxy-4-(2'-hydroxyethoxy)-4,6-di(2,4-diphenyl)triazine.

The polycarbonate resin molded article of the present invention is a coextruded article composed of a core layer comprising the above-described thermoplastic aromatic polycarbonate resin and a cover layer comprising the above-described thermoplastic aromatic polycarbonate resin which is provided on at least one side of the core layer.

The polycarbonate resin coextruded article is produced by coextruding thermoplastic aromatic polycarbonate resin compositions containing necessary additives and having been previously plasticized from at least one extruder at 240 to 400° C. to form a core layer and a cover layer. Since both the core and cover layers are of thermoplastic aromatic polycarbonate resins, they have the same extensibility so that no increased cracks develop in the cover layer even under stress, and they exhibit good adhesion to each other.

If desired, the thermoplastic aromatic polycarbonate resin forming the core layer can contain the triazine light stabilizer of formula (I), the benzotriazole light stabilizer of formula (II), the phosphorous ester compound of formula (III), the phenolic compound of formula (IV), and other additives customarily added, for example, other light stabilizers, heat stabilizers, fillers, pigments, and antistatic agents.

While not limiting, the core layer usually has a thickness of 2 to 10 mm. The core layer is usually extruded flat but can have a curved surface, such as a corrugated form or a domed form. The core layer can be formed into a three-dimensional shape by other methods. Further, the core layer may have one or more hollow parts.

The cover layer is provided on at least one side of the core layer by coextruding a resin composition comprising the above-described thermoplastic aromatic polycarbonate resin and the triazine light stabilizer of formula (I).

The triazine light stabilizer is added in an amount of 0.1 to 25 parts by weight, preferably 0.5 to 15 parts by weight, per 100 parts by weight of the thermoplastic aromatic polycarbonate resin forming the cover layer. If the amount of the triazine light stabilizer is less than 0.1 part by weight, sufficient effects on weatherability and coloring resistance are not obtained. Addition of more than 25 parts by weight results in no further improvement only to incur bleeding.

The cover layer preferably has a thickness of 5 to 100 $\mu$m, particularly 20 to 50 $\mu$m.

If it is thinner than 5 $\mu$m, the effects as a cover layer cannot be expected. A thicker cover layer than 5 $\mu$m is only too thick and consumes more additives than required, which is rather bad economy.

If desired, the cover layer can contain additives, such as antioxidants, other light stabilizers, fillers, pigments, and antistatic agents. Particularly preferred additives for use in the cover layer include light stabilizers other than those represented by formula (I), antioxidants of phosphorous type, phenol type, thioether type, etc., and hindered amine type light stabilizers.

Useful light stabilizers other than those of formula (I) include 2-hydroxybenzophenones, such as 2,4-dihydroxybenzophenone, 2-hydroxy-4-methoxybenzophenone, 2-hydroxy-4-octoxybenzophenone, 2-hydroxy-4-t-butyl-4'-(2-methacryloyloxyethoxyethoxy)benzophenone, and 5,5'-methylenebis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-t-octylphenyl)benzotriazole, 2-(2-hydroxy-3,5-di-t-butylphenyl)-5-chlorobenzotriazole, 2-(2-hydroxy-3-t-butyl-5-methylphenyl)-5-chlorobenzotriazole, 2-(2-hydroxy-3-dodecyl-5-methylphenyl)benzotriazole, 2-(2-hydroxy-3-t-butyl-5-($C_{7-9}$-mixed)alkoxycarbonylethylphenyl)triazole, 2-(2-hydroxy-3,5-dicumylphenyl)benzotriazole, 2,2'-methylenebis(4-t-octyl-6-benzotriazolylphenol), and polyethylene glycol ester of 2-(2-hydroxy-3-t-butyl5-carboxyphenyl)benzotriazole; 2-(2-hydroxyphenyl)-1,3,5-triazines, such as 2-(2-hydroxy-4-hexyloxyphenyl)-4,6diphenyl-1,3,5-triazine, 2-(2-hydroxy4-methoxyphenyl)4,6-diphenyl-1,3,5-triazine, 2-(2-hydroxy-4-octoxyphenyl)-4,6-bis(2,4-dimethylphenyl)-1,3, 5-triazine, and 2-(2-hydroxy-4-acryloyloxyethoxyphenyl)-4,6-bis(2,4-dimethylphenyl)1,3,5-triazine; benzoates, such as phenyl salicylate, resorcinol monobenzoate, 2,4-di-t-butylphenyl 3,5-di-t-butyl-4-hydroxybenzoate, 2,4-di-t-amylphenyl 3,5-di-t-butyl-4hydroxybenzoate, and hexadecyl 3,5-di-t-butyl-4-hydroxybenzoate; and cyanoacrylates, such as ethyl $\alpha$-cyano-$\beta$,$\beta$-diphenylacrylate and methyl 2-cyano-3-methyl-3-(p-methoxyphenyl)acrylate. In particular, 2,2'-methylenebis(4-t-octyl-6-benzotriazolylphenol) is preferred; for it produces synergistic effects with the triazine light stabilizers used in the present invention.

The above-described light stabilizer is added in an amount of 0.1 to 25 parts by weight, preferably 0.5 to 15 parts by weight, per 100 parts by weight of the thermoplastic aromatic polycarbonate resin. If the amount of the light stabilizer is less than 0.1 part by weight, sufficient improving effects on the weatherability and coloring resistance of the polycarbonate resin are not produced. Addition of more than 25 parts by weight brings about no further improvement, only causing bleeding.

Examples of the phosphorous antioxidants include triphenyl phosphite, tris(2,4-di-t-butylphenyl) phosphite, tris(nonylphenyl) phosphite, tris(dinonylphenyl) phosphite, tris(mono-, di-mixed nonylphenyl) phosphite, bis(2-t-butyl-4,6-dimethylphenylethyl phosphite, acid diphenyl phosphite, 2,2'-methylenebis(4,6-di-t-butylphenyl)octyl phosphite, diphenyldecyl phosphite, phenyldiisodecyl phosphite, tributyl phosphite, tris(2-ethylhexyl) phosphite, tridecyl phosphite, trilauryl phosphite, acid dibutyl phosphite, acid dilauryl phosphite, trilauryl trithiophosphite, bis(neopenyl glycol1,4-cyclohexanedimethyl diphosphite, bis(2,4-di-t-butylphenyl)pentaerythritol diphosphite, bis(2,6-di-t-butyl-4-methylphenyl)pentaerythritol diphosphite, distearylpentaerythritol diphosphite, phenyl-4,4'-isopropylidenediphenol pentaerythritol diphosphite, tetra ($C_{12-15}$-mixed alkyl)-4,4'-isopropylidenediphenyl phosphite, bis[2,2'-methylenebis(4,6-diamylphenyl)] isopropylidenediphenyl phosphite, hydrogenated 4,4'-isopropylidenediphenol polyphosphite, bis(octylphenyl)bis[4,4'-n-butylidenebis(2-t-butyl-5-methylphenol)]-1,6-hexanediol diphosphite, tetratridecyl-4,4'-butylidenebis(2-t-butyl-5-methylphenol)diphosphite, hexa(tridecyl)-1,1,3-tris(2-methyl-5-t-butyl-4-hydroxyphenyl)butane triphosphonite, 9,10-dihydro-9-oxa-10-phosphaphenathrene 10-oxide, and 2-butyl-2-ethylpropanediol-2,4,6-tri-t-butylphenol monophosphite. Preferred among them is bis(2,6-di-t-butyl-4-methylphenyl)pentaerythritol diphosphite; for it produces synergistic effects with the triazine light stabilizer used in the invention.

Examples of phenolic antioxidants include 2,6di-t-butyl-p-cresol 2,6-diphenyl-4-octadesiloxyphenol stearyl (3,5-di-t-butyl-4-hydroxyphenyl)propionate, distearyl(3,5-di-t-10 butyl-4-hydroxybenzyl) phosphonate, tridecyl-3,5-di-t-butyl-4-hydroxybenzylthioacetate, thiodiethylenebis[(3,5-di-t-butyl-4-hydroxyphenyl)propionate], 4,4'-thiobis(6-t-butyl-m-cresol), 2-octylthio-4,6-di(3,5-di-t-butyl-4-hydroxyphenoxy)-s-triazine, 2,2'-methylenebis(4-methyl-6t-butylphenol), bis[3,3-bis(4-hydroxy-3-t-butylphenyl)butyric acid] glycol ester, 4,4'-butylidenebis(4,6-di-t-butylphenol), 2,2'-ethylidenebis(4,6-di-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl) phenyl] terephthalate, 1,3,5-tris(2,6dimethyl-3-hydroxy-4-t-butylbenzyl) isocyanurate, 1,3,5-tris(3,5-di-t-butyl-4-hydroxybenzyl) isocyanurate, 1,3,5-tris[3,5-di-t-butyl-4-hydroxybenzyl)-2,4,6-trimethylbenzene, 1,3,5-tris[(3,5-di-t-butyl-4-hydroxyphenyl)propionyloxyethyl] isocyanurate, tetrakis[methylene-3-(3,5-di-t-butyl-4-hydroxyphenyl) propionate]methane, 2-t-butyl-4-methyl-6(2-acryloyloxy-3-t-butyl-5-methylbenzyl)phenot 3,9-bis[2-(3-t-butyl-4-hydroxy-5-methylhydrocinnamoyloxy)-1,1-dimethylethyl]-2,4,8,10-tetraoxaspiro[5.5]undecane], triethylene glycol bis [β-(3-t-butyl-4-hydroxy-5-methylphenyl)propionate], 2-t-butyl-6-(3'-t-butyl-5'-methyl-2'-hydroxybenzyl)-4-methylphenyl acrylate, 2,4-di-t-amyl-6-[(3,5-di-t-amyl-2-hydroxyphenyl)ethyl]phenyl acrylate, and 2,2'-ethylidenebis(4-sec-butyl-6-butylphenol). Preferred of them is tetrakis[methylene-3-(3,5-di-t-butyl-4-hydroxyphenyl)propionate]methane; for it brings about synergistic effects with the light stabilizer used in the present invention.

The phosphorous antioxidants or phenolic antioxidants are added in an amount of 0.001 to 5 parts by weight, preferably 0.01 to 1 part by weight, per 100 parts by weight of the thermoplastic aromatic polycarbonate resin. If the amount of the phosphorous antioxidants or phenolic antioxidants are less than 0.001 part by weight, sufficient effects on weatherability and coloring resistance are not expected. If it is more than 5 parts by weight, no further improvement is expected, but bleeding can result.

Examples of the thioether antioxidant include dialkyl thiodipropionates, such as dilauryl thiodipropionate, dimyristyl thiodipropionate, myristylstearyl thiodipropionate, and distearyl thiodipropionate; and, β-alkylmercaptopropionic esters of polyol, such as pentaerythritol tetra(β-dodecylmercaptopropionate).

Examples of the hindered amine light stabilizers include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl) sebacate, bis(2,2,6,6-tetramethyl-N-4-oxyl-4-piperidyl) sebacate, bis(1,2,2,6,6-pentamethyl bis(1-octoxy-2,2,6,6-tetramethyl-4-piperidyl) sebacate, tetrakis(2,2,6,6-tetramethyl-4-piperidyl) 1,2,3,4-butanetetracarboxylate, tetrakis(1,2,2,6,6-pentamethyl-4-piperidyl) 1,2,3,4-butanetetracarboxylate, bis(2,2,6,6-tetramethyl-4-piperidyl)bis(tridecyl) 1,2,3,4-butanetetracarboxylate, bis(1,2,2,6,6-pentamethyl-4-piperidyl)bis(tridecyl) 1,2,3,4-butanetetracarboxylate, bis(1,2,2,6,6-pentamethyl-4-piperidyl)-2-butyl-2-(3,5-di-t-butyl-4-hydroxybenzyl) malonate, 1-(2-hydroxyethyl) 2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-t-octylamino-s-triazine polycondensate, 1,5, 8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino-s-triazine-6-ylamino]undecane, 1,6,11-tris[2,4-bis(N-butyl-N-(1,2,2,6,6-pentamethyl-4-piperidyl)amino-s-triazine-6-ylamino]undecane, 3,9-bis[1,1-dimethyl-2-{tris(2,2,6,6-tetramethyl-4-piperidyloxycarbonyloxy) butylcarbonyloxy}ethyl]-2,4,8,10-tetraoxaspiro[5.5] undecane, and 3,9-bis[1,1-dimethyl-2-{tris(1,2,2,6,6-pentamethyl-4-piperidyloxycarbonyloxy) butylcarbonyloxy}ethyl]-2,4,8,10-tetraoxaspiro[5.5] undecane.

The polycarbonate resin molded articles according to the present invention are useful as food packaging containers, interior and exterior automotive trim parts, various precision machines, and constructional materials.

The present invention will now be illustrated in greater detail with reference to Examples, but it should be understood that the invention is not deemed to be limited thereto

SYNTHESIS EXAMPLE 1

Synthesis of Compound No. 2

In 195 g of ethanol were dissolved 47 g (0.3 mol) of benzamidine hydrochloride and 33 g (0.14 mol) of phenyl resorcinate, and 58 g (0.3 mol) of a 28 wt % solution of sodium methylate was added thereto. The mixture was heated to 78° C. while stirring. After methanol evaporated, the stirring at that temperature was continued for 20 hours. The reaction mixture was cooled to 5° C., followed by filtration. The collected solid was washed with methanol and then water to obtain 18.4 g (yield: 37.7%) of pale yellow crystals.

To 17.0 g (0.05 mol) of the resulting 2-(2,4-dihydroxyphenyl)-4,6-diphenyl-s-triazine were added 94.8 g (0.75 mol) of 2-bromoethanol and 85 g of dimethylformamide, and 29.2 g (0.35 mol) of a 48% aqueous solution of sodium hydroxide was added thereto dropwise at 85° C. The mixture was allowed to react at 85° C. for 10 hours, followed by cooling. The reaction mixture was neutralized with concentrated hydrochloric acid, and the precipitate was collected by filtration, washed with water, and dried to give 15.4 g (80%) of 2-hydroxy-4-(2-hydroxyethyloxy)phenyl-4,6-diphenyl-s-triazine (hereinafter referred to as HETr). To 15 g (0.039 mol) of the resulting HETr were added 6.8 g (0.047 mol) of octylic acid, 45 g of xylene, and 0.6 g of p-toluenesulfonic acid, and the mixture was heated under reflux at 140° C. for 10 hours. The reaction mixture was washed with water and recrystallized from a 1:3 mixed solvent of xylene and methanol to give 16.9 g (85%) of a pale yellow solid having a melting point of 109° C.

The $^1$H-NMR spectrum of the resulting compound showed the following chemical shifts (number of protons, assignment): 0.8–2.5 (15H, octyl), 4.2–4.6 (4H, —OCH$_2$CH$_2$O—), 6.5–6.8 (2H, Ar—H (adjacent to Ar—O)), 7.4–7.8 (6H, Ar—H (adjacent to Ar—H)), 8.4–8.8 (5H, Ar—H (adjacent to Ar—T; T: triazine)), and 13.5 (1H, —OH (hydrogen bonding)).

The IR absorption spectrum of the compound showed peaks at 3300–3500, 2800–3200, 1720, 1630, 1590, 1530, 1440, 1420, 1370, 1350, 1260, and 1180 cm$^{-1}$.

SYNTHESES EXAMPLE 2

Synthesis of Mixed Triazine light Stabilizers (I) wherein n is mainly 6

In an autoclave were put 34.1 g of 2-(2',4'-dihydroxyphenyl)-4,6-diphenyl-1,3,5-triazine, 0.4 g of sodium hydroxide, and 300 ml of anhydrous diglyme (solvent), temperature was elevated to 120° C. in a nitrogen atmosphere, 27 g (corresponding to 6 mol) of ethylene oxide was fed to 2 to 3 atms., and the mixture was allowed to react for 5 hours. After completion of the reaction, the reaction mixture was poured into 200 ml of a 0.1N hydrochloric acid solution under ice-cooling for neutralization to obtain a white powder. The resulting powder was a mixture comprising 73% of an ethylene oxide (6 mol) adduct and, in minor proportions, 4 to 8 mol adducts.

A mixture of 30 g of the resulting powder, 7.2 g of octylic acid, 0.5 g of p-toluenesulfonic acid, and 200 ml of xylene was subjected to dehydration reaction under reflux for 5 hours. After completion of the reaction, the product was washed with water, and the solvent was evaporated to yield 34 g of a glassy solid. The main component forming the proportion of 50% or more of the resulting mixture was Compound No. 8.

EXAMPLE 1

Bisphenol A polycarbonate powder having an intrinsic viscosity of 0.57 (in dioxane, 30° C.) was used as a core layer material. The same polycarbonate powder mixed with 10 wt % of Compound No. 1 (triazine light stabilizer of formula (I)) was kneaded in an extruder at 280° C. and 80 rpm, extruded, and pelletized to prepare a cover layer material. The core layer material and the cover layer material were coextruded at 280° C. and immediately brought into contact with each other to prepare a test piece having a 2 mm thick core layer and a 50 μm thick cover layer.

The yellowness index (YI; ASTM D1925) of the test piece was measured by a reflection mode to evaluate coloring resistance. The test piece was subjected to 1000 hour UV irradiation in a sunshine weatherometer (including rain), and the yellowness index was measured in the same manner to obtain Δ YI, by which to evaluate weatherability. The results obtained are shown in Table 1 below.

EXAMPLES 2 TO 6

A test piece was prepared in the same manner as in Example 1, except for replacing Compound No. 1 as a light stabilizer with each of Compound Nos. 2 to 6. The results of evaluation are shown in Table 1

COMPARATIVE EXAMPLE 1

A test piece was prepared in the same manner as in Example 1, except that any light stabilizer was added to the cover layer. The results of evaluation are shown in Table 1.

COMPARATIVE EXAMPLES 2 AND 3

A test piece was prepared in the same manner as in Example 1, except for replacing Compound No. 1 as a light stabilizer with Comparative Compound A or B shown below. The results of evaluation are shown in Table 1.

Comparative Compound A

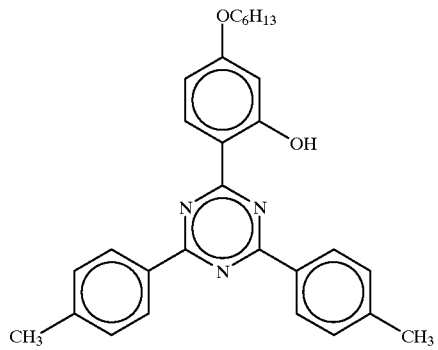

Comparative Compound B

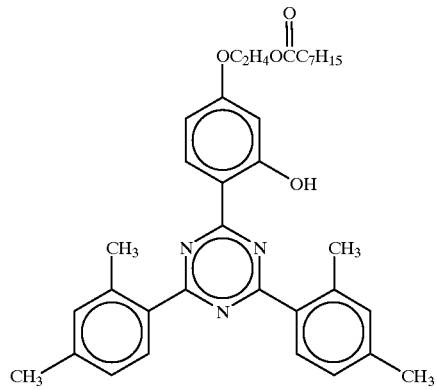

TABLE 1

| | Light Stablilizer (Compound No.) | YI* | ΔYI* |
|---|---|---|---|
| Example 1 | No. 1 | 15.7 | 5.5 |
| Example 2 | No. 2 | 15.1 | 5.1 |
| Example 3 | No. 3 | 14.7 | 5.4 |
| Example 4 | No. 4 | 14.2 | 5.9 |
| Example 5 | No. 5 | 17.1 | 5.8 |
| Example 6 | No. 6 | 16.5 | 6.2 |
| Example 7 | No. 7 | 16.0 | 6.7 |
| Compa. Example 1 | none | 10.8 | white turbid |
| Compa. Example 2 | A | 18.4 | 10.6 |
| Compa. Example 3 | B | 20.1 | 10.4 |

*Reflection mode

EXAMPLES 8 TO 21 AND COMPARATIVE EXAMPLES 4 TO 12

Test pieces were prepared in the same manner as in Example 1, except for changing the kind and amount of the additive used in the cover layer as shown in Tables 2 and 3 below.

The yellowness index (YI; ASTM D1925) of the test pieces was measured by a transmission mode to evaluate coloring resistance. The test pieces were subjected to 1000 hour UV irradiation in a sunshine weatherometer (including rain), and the yellowness index was measured in the same manner to obtain Δ YI, by which to evaluate weatherability. The results obtained are shown in Tables 2 and 3.

TABLE 2

| Example No. | Additive Kind | Amount (wt %) | YI* | Δ YI* |
|---|---|---|---|---|
| 8 | No. 1 | 5.0 | 2.8 | 3.1 |
| 9 | No. 2 | 5.0 | 2.3 | 2.9 |
| 10 | No. 3 | 5.0 | 2.0 | 3.0 |
| 11 | No. 4 | 5.0 | 1.8 | 3.5 |
| 12 | No. 5 | 5.0 | 4.0 | 3.7 |
| 13 | No. 6 | 5.0 | 3.5 | 3.8 |
| 14 | No. 7 | 5.0 | 3.0 | 4.0 |
| 15 | No. 8[1] | 5.0 | 2.2 | 3.3 |
| 16 | No. 2<br>LA-31[2] | 3.0<br>2.0 | 2.0 | 3.1 |
| 17 | No. 2<br>PEP-36[3] | 5.0<br>0.05 | 2.0 | 2.8 |
| 18 | No. 2<br>AO-60[4] | 5.0<br>0.05 | 2.0 | 2.8 |
| 19 | No. 1<br>LA-31<br>PEP-36 | 3.0<br>2.0<br>0.05 | 1.8 | 2.8 |
| 20 | No. 1<br>LA-31<br>AO-60 | 3.0<br>2.0<br>0.05 | 1.8 | 2.8 |
| 21 | No. 1<br>LA-31<br>PEP-36<br>AO-60 | 3.0<br>2.0<br>0.05<br>0.05 | 1.7 | 2.8 |

Note: *: Transmission mode
[1]: Mixture obtained in Synthesis Example 2
[2]: 2,2'-Methylenebis(4-t-octyl-6-benzotriazolylphenol)
[3]: Bis(2,6-di-t-butyl-4-methylphenyl)pentaerythritol diphosphite
[4]: Tetrakis[methylene-3-(3,5-di-t-butyl-4-hydroxyphenyl)propionate]methane

TABLE 3

| Comparative Example No. | Additive Kind | Amount (wt %) | YI* | Δ YI* |
|---|---|---|---|---|
| 4 | none | — | 1.0 | White turbid |
| 5 | A | 5.0 | 5.2 | 6.5 |
| 6 | B | 5.0 | 5.6 | 6.2 |
| 7 | A<br>LA-31 | 3.0<br>2.0 | 4.5 | 6.5 |
| 8 | A<br>PEP-36 | 5.0<br>0.05 | 4.5 | 6.0 |
| 9 | A<br>AO-60 | 5.0<br>0.05 | 4.6 | 6.1 |
| 10 | A<br>LA-31<br>PEP-36 | 3.0<br>2.0<br>0.05 | 4.3 | 6.5 |
| 11 | A<br>LA-31<br>AO-60 | 3.0<br>2.0<br>0.05 | 4.2 | 6.1 |
| 12 | A<br>LA-31<br>PEP-36<br>AO-60 | 3.0<br>2.0<br>0.05<br>0.05 | 4.0 | 6.1 |

The results in Tables 1 to 3 prove that addition of the triazine light stabilizers having the specific structure according to the present invention (Examples 1 through 15) improves both coloring resistance and weatherability of the polycarbonate resin without impairing the appearance. To the contrary, where a triazine light stabilizer having no ester structure is used (Comparative Examples 2 and 5), the resistance to coloring due to processing and weatherability were inferior compared with Examples. Also where a triazine light stabilizer which has an ester structure but is different from the triazine light stabilizers of the invention in the number of substituents is used (Comparative Examples 3 and 6), the resistance to coloring due to processing and weatherability are inferior.

It has been confirmed that a combination of the specific triazine stabilizer of the present invention and at least one of the other benzotriazole light stabilizer (LA-31), the phosphorous ester compound (PEP-36), and the phenol compound (AO-60) in a specific ratio produces synergism in weatherability.

Accordingly, it is apparent that the polycarbonate resin containing the triazine light stabilizer of the present invention is markedly excellent in resistance to coloring due to high-temperature processing and weatherability compared with the polycarbonate resin containing the conventional triazine light stabilizer.

The polycarbonate resin coextruded articles according to the present invention exhibt improved resistance to coloring due to high-temperature processing and improved weatherability.

What is claimed is:

1. A polycarbonate resin coextruded article having a core layer comprising a, thermoplastic aromatic polycarbonate resin and a cover layer comprising a thermoplastic aromatic polycarbonate resin which is provided on at least one side of the core layer, wherein said cover layer comprises a resin composition comprising 100 parts by weight of a thermoplastic aromatic polycarbonate resin and 0.1 to 25 parts by weight of a triazine light stabilizer represented by formula (I):

(I)

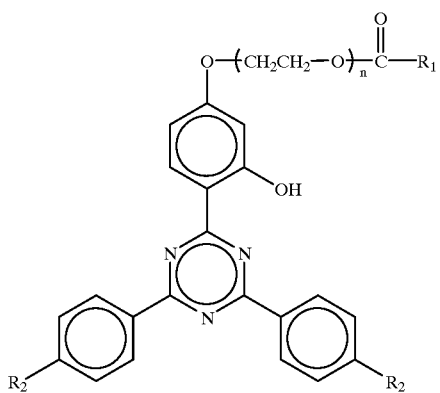

wherein $R_1$ represents an alkyl group having 1 to 17 carbon atoms; R2 represents a hydrogen atom or an alkyl group having 1 to 4 carbon atoms; and n represents an integer of 1 to 20.

2. The polycarbonate resin coextruded article according to claim 1, wherein said cover layer has a thickness of 5 to 100 μm.

3. The polycarbonate resin coextruded article according to claim 1, wherein said resin composition contains 0.1 to 10 parts by weight of a benzotriazole light stabilizer represented by formula (II) per 100 parts by weight of the thermoplastic aromatic polycarbonate resin:

(II)

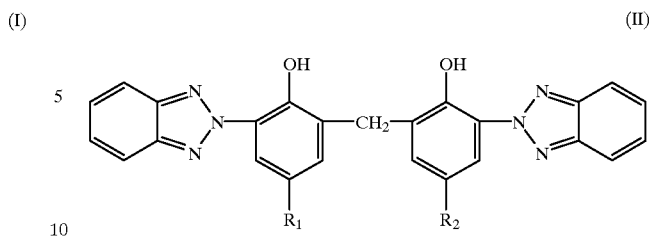

wherein $R_1$ and $R_2$ are as defined above.

4. The polycarbonate resin coextruded article according to claim 1, wherein said resin composition contains 0.001 to 5 parts by weight of a phosphorous ester compound represented by formula (III) per 100 parts by weight of the thermoplastic aromatic polycarbonate resin:

(III)

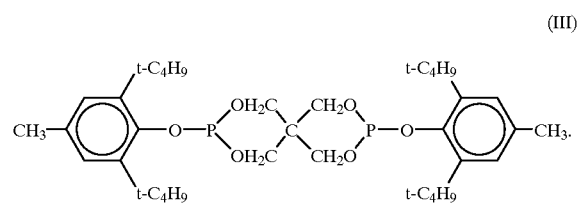

5. The polycarbonate resin coextruded article according to claim 1, wherein said resin composition contains 0.001 to 5 parts by weight of a phenol compound represented by formula (IV) per 100 parts by weight of the thermoplastic aromatic polycarbonate resin:

(IV)

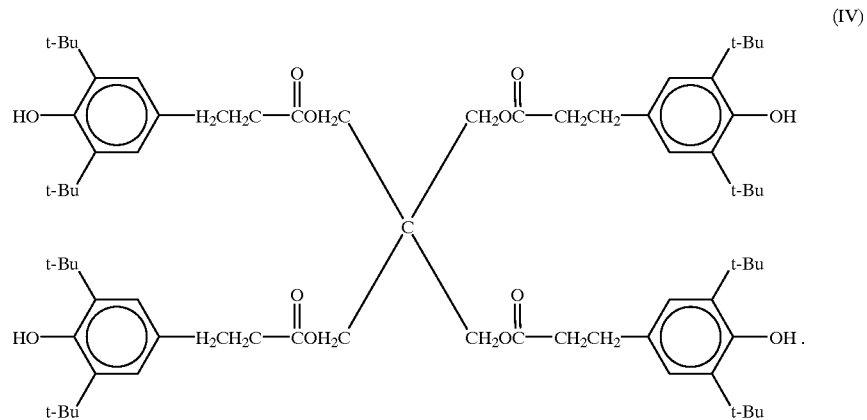

6. The polycarbonate resin coextruded article according to claim 3, wherein said resin composition contains 0.001 to 5 parts by weight of a phosphorous ester compound represented by formula (III) per 100 parts by weight of the thermoplastic aromatic polycarbonate resin:

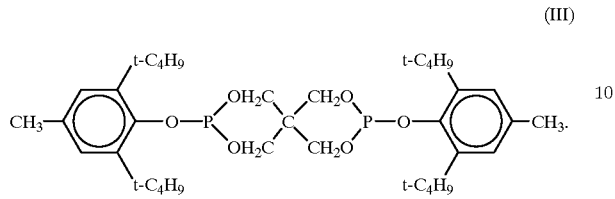
(III)

7. The polycarbonate resin coextruded article according to claim 3, wherein said resin composition contains 0.001 to 5 parts by weight of a phenol compound represented by formula (IV) per 100 parts by weight of the thermoplastic aromatic polycarbonate resin:

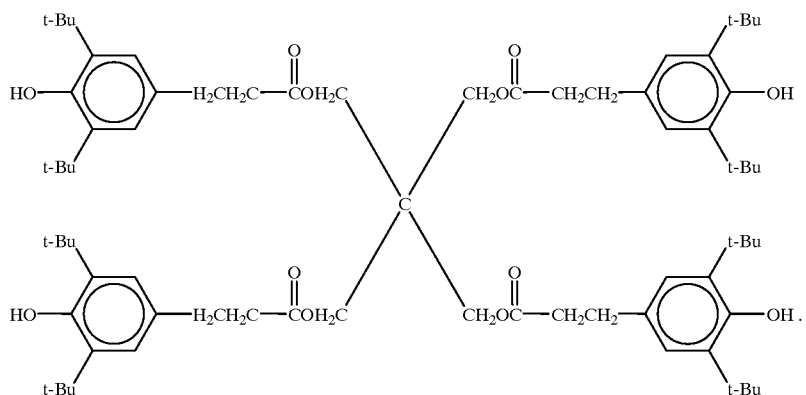
(IV)

8. The polycarbonate resin coextruded article according to claim 4, wherein said resin composition contains 0.001 to 5 parts by weight of a phenol compound represented by formula (IV) per 100 parts by weight of the thermoplastic aromatic polycarbonate resin:

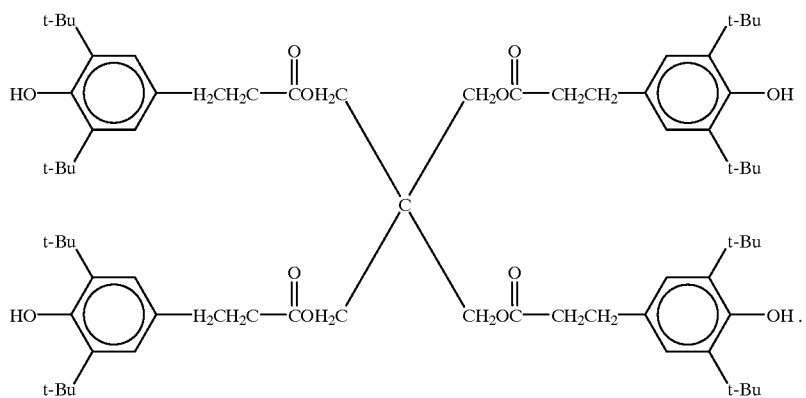
(IV)

9. The polycarbonate resin coextruded article according to claim 6, wherein said resin composition contains 0.001 to 5 parts by weight of a phenol compound represented by formula (IV per 100 parts by weight of the thermoplastic aromatic polycarbonate resin:

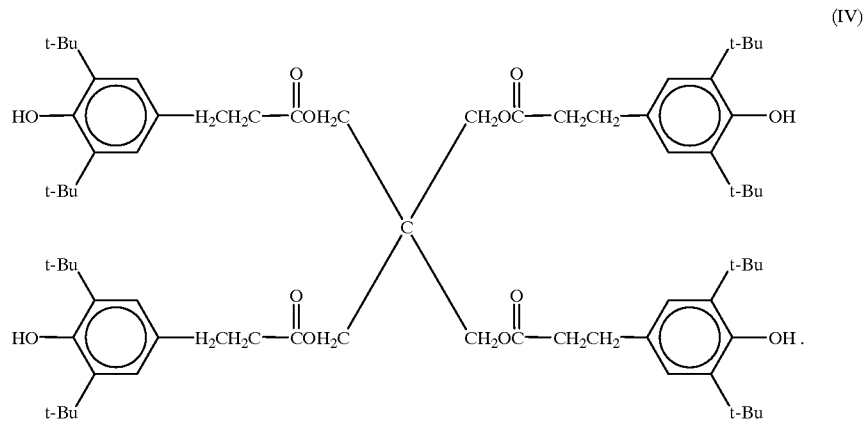

(IV)

10. The polycarbonate resin coextruded article according to claim 1, wherein n is 1, $R_1$ is a heptyl group, and $R_2$ is a hydrogen atom.

11. The polycarbonate resin coextruded article according to claim 1, wherein n is 1, $R_1$ is an undecyl group, and $R_2$ is a hydrogen atom.

12. The polycarbonate resin coextruded article according to claim 1, wherein n is 1, $R_1$ is a heptyl group, and $R_2$ is a methyl group.

13. The polycarbonate resin coextruded article according to claim 1, wherein n is 1, $R_1$ is an undecyl group, and $R_2$ is a methyl group.

14. The polycarbonate resin coextruded article according to claim 3, wherein $R_1$ and $R_2$ in formula (II) are each a t-octyl group.

15. The polycarbonate resin coextruded article according to claim 1, wherein the amount of the triazine light stabilizer is 0.5 to 15 parts by weight per 100 parts by weight of the thermoplastic aromatic polycarbonate resin.

* * * * *